US009636614B2

(12) United States Patent
Akdim et al.

(10) Patent No.: US 9,636,614 B2
(45) Date of Patent: May 2, 2017

(54) GAS DESANDER

(71) Applicant: FMC Separation Systems, BV, Amsterdam (NL)

(72) Inventors: Mohamed Reda Akdim, Nieuwegen (NL); Tarig Mukthar Abdalla, Amsterdam (NL)

(73) Assignee: FMC Separation Systems, BV, Amsterdam (NL)

( * ) Notice: Subject to any disclaimer, the term of this patent is extended or adjusted under 35 U.S.C. 154(b) by 145 days.

(21) Appl. No.: 14/758,228

(22) PCT Filed: Jan. 9, 2013

(86) PCT No.: PCT/EP2013/050268
§ 371 (c)(1),
(2) Date: Jun. 27, 2015

(87) PCT Pub. No.: WO2014/108177
PCT Pub. Date: Jul. 17, 2014

(65) Prior Publication Data
US 2015/0328572 A1 Nov. 19, 2015

(51) Int. Cl.
*B01D 50/00* (2006.01)
*B01D 45/16* (2006.01)
(Continued)

(52) U.S. Cl.
CPC ............... *B01D 45/16* (2013.01); *B04C 3/06* (2013.01); *B04C 5/06* (2013.01); *B04C 5/103* (2013.01);
(Continued)

(58) Field of Classification Search
CPC ...... B01D 45/16; B01D 45/12; B01D 50/002; B04C 5/103; B04C 5/06; B04C 5/14; B04C 3/06; B04C 5/13
See application file for complete search history.

(56) References Cited

U.S. PATENT DOCUMENTS 2,193,883 A    3/1940 Reeves
2,582,423 A *  1/1952 Foley .................. B04C 5/14
                                        55/398
(Continued)

FOREIGN PATENT DOCUMENTS

DE    202009016437 U1    4/2010
WO    WO 00/25931 A1     5/2000
(Continued)

*Primary Examiner* — Dung H Bui

(57) ABSTRACT

The present invention provides a device for removing solids from a gas stream. The device comprises a longitudinal hollow element (2) comprising an inlet (9), a first outlet (10) and second outlet (11), and an internal rotation-generating element (12) for the gas stream, and the rotation-generating element (12), which causes the gas stream to rotate around a centerline (Y) of the hollow element (2), is arranged between the first outlet (10) and the second outlet (11) in the longitudinal direction of the hollow element (2), and comprises a central axial passage (13), said passage is fluidly connected to the first outlet (10) by an extraction line (14), said first outlet (10) arranged between the inlet (9) and the rotation-generating element (12) in the longitudinal direction of the hollow element, wherein a section (23) of the hollow element is arranged between the second outlet (11) and the rotation-generating element and has a decreasing inner circumference in the longitudinal direction of the hollow element (2) towards the second outlet.

10 Claims, 2 Drawing Sheets

(51) Int. Cl.
  *B04C 5/103* (2006.01)
  *B04C 3/06* (2006.01)
  *B04C 5/06* (2006.01)
  *B04C 5/13* (2006.01)
  *B04C 5/14* (2006.01)

(52) U.S. Cl.
  CPC ............... *B04C 5/13* (2013.01); *B04C 5/14* (2013.01); *B01D 50/002* (2013.01)

(56) References Cited

U.S. PATENT DOCUMENTS

| | | | | |
|---|---|---|---|---|
| 3,030,755 A * | 4/1962 | Farr | ............ | B04C 3/04 |
| | | | | 55/456 |
| 3,420,040 A | 1/1969 | Neely et al. | | |
| 3,641,745 A * | 2/1972 | Moore | ............ | B01D 45/12 |
| | | | | 55/345 |
| 4,420,314 A | 12/1983 | Barron, Jr. | | |
| 4,430,100 A * | 2/1984 | Cardo | ............ | B01D 45/12 |
| | | | | 209/154 |
| 7,163,626 B1 * | 1/2007 | Cuypers | ............ | B04C 3/00 |
| | | | | 210/188 |
| 7,503,950 B2 * | 3/2009 | Håland | ............ | B01D 19/0063 |
| | | | | 55/315 |
| 8,025,706 B2 * | 9/2011 | Poorte | ............ | B01D 19/0036 |
| | | | | 55/345 |
| 8,226,743 B2 * | 7/2012 | Betting | ............ | B01D 45/16 |
| | | | | 55/423 |
| 8,431,098 B2 * | 4/2013 | Anderson | ............ | B01D 45/12 |
| | | | | 204/157.3 |
| 8,852,323 B2 * | 10/2014 | Schook | ............ | B01D 17/0217 |
| | | | | 55/396 |
| 8,991,622 B2 * | 3/2015 | Schook | ............ | B01D 45/16 |
| | | | | 210/512.3 |
| 9,427,689 B2 * | 8/2016 | Kochubei | ............ | B01D 45/16 |
| 2003/0033791 A1 * | 2/2003 | Elliott | ............ | B01D 45/16 |
| | | | | 55/396 |
| 2004/0025481 A1 | 2/2004 | Bugli et al. | | |
| 2009/0049809 A1 * | 2/2009 | Christiansen | ............ | B04C 3/06 |
| | | | | 55/319 |
| 2009/0196806 A1 * | 8/2009 | Larnholm | ............ | B01D 45/12 |
| | | | | 422/269 |
| 2009/0235823 A1 * | 9/2009 | Tan | ............ | B01D 45/12 |
| | | | | 96/251 |
| 2009/0282791 A1 * | 11/2009 | Lang | ............ | A47L 9/1608 |
| | | | | 55/326 |
| 2010/0006516 A1 * | 1/2010 | Schook | ............ | B01D 19/0057 |
| | | | | 210/787 |
| 2011/0296985 A1 * | 12/2011 | Buhrman | ............ | B01D 45/12 |
| | | | | 95/34 |
| 2013/0228076 A1 * | 9/2013 | Balepin | ............ | B04C 7/00 |
| | | | | 95/271 |
| 2013/0247764 A1 * | 9/2013 | Kvamsdal | ............ | B04C 3/04 |
| | | | | 96/188 |
| 2013/0312609 A1 * | 11/2013 | van Vorselen | ............ | B01D 45/16 |
| | | | | 95/268 |
| 2014/0225286 A1 * | 8/2014 | Paxton | ............ | B01D 45/16 |
| | | | | 261/79.2 |
| 2014/0326684 A1 * | 11/2014 | Antoun | ............ | B01D 21/2411 |
| | | | | 210/801 |

FOREIGN PATENT DOCUMENTS

WO   WO 2004/009244 A2   1/2004
WO   WO 2007/108704 A1   9/2007

* cited by examiner

GAS DESANDER

FIELD OF THE INVENTION

The present invention concerns the field of gas purification, more specifically the removal of solids from a gas stream, particularly a stream of natural gas from a production well.

BACKGROUND OF THE INVENTION

Well gas streams in mature gas fields have a tendency to produce more solids, such as sand, over the years. To prevent solids accumulation and erosion of the downstream equipment, including choke valves, separators, risers, piping, hydrocyclones and pumps, and to assure continuous operation of the production facility it is important to remove the solids, preferably as early as possible in the separation process The presence of solids in gas streams is a major challenge in the production of natural gas. The velocity of such gas streams can be higher than 10 m/s which result in severe erosion of downstream equipment, as well as clogging of same.

Present solutions for removing solids from gas streams are often efficient for larger type solids such as sand. However, removal of small particle size solids (particle sizes down to less than 5 microns) as found in fines and clay is not efficient when known techniques for inline separation systems are used. This is especially true for relatively dry gas streams, wherein the removal of solids is not helped by the simultaneous agglomeration of liquids. When the gas stream is relatively wet, the liquids separated in for instance a gas-liquid separator will also help to remove a large amount of the solids, even fines and clay.

In view of the prior art, there is a need for equipment and methods for the removal of solids from continuous gas streams. In particular, solutions for the removal of fines and clay from relatively dry gas streams are needed.

SUMMARY OF THE INVENTION

The present invention provides a device for the removal of solids from a continuous gas stream. In addition to separating larger sized solids, such as sand, from a continuous gas stream, the device is also capable of separating smaller sized particles such as fines and clay. The separation is efficient even for dry gas streams. The device according to the invention is defined by the appended claims, and in the following:

In a first aspect of the invention, the device for removing solids from a gas stream, comprises a longitudinal hollow element comprising an inlet, a first outlet and a second outlet, and an internal rotation-generating element for the gas stream, and the rotation-generating element, which causes the gas stream to rotate around a centerline of the hollow element, is arranged between the first outlet and the second outlet in the longitudinal direction of the hollow element, and comprises a central axial passage, said passage is fluidly connected to the first outlet by an extraction line, said first outlet arranged between the inlet and the rotation-generating element in the longitudinal direction of the hollow element, wherein a section of the hollow element is arranged between the second outlet and the rotation-generating element and has a decreasing inner circumference in the longitudinal direction of the hollow element towards the second outlet. The section having a decreasing inner circumference may be arranged centric or off-center with regard to the centerline of the hollow element, and may advantageously comprise a mainly horizontal lower part. When the centerline of the hollow element is horizontal, a section having a mainly horizontal lower part will contribute to a more efficient transportation of the solids in the direction of the second outlet.

The central axial passage of the rotation-generating element may further be defined having an inlet and an outlet, and the rotation-generating element having rotation-generating means. The rotation-generating means may, for instance, comprise blades or vanes arranged to direct the gas stream in a direction deviating from the longitudinal direction of the hollow element. The inlet of the central axial passage of the rotation-generating element is situated downstream of the rotation-generating means and the outlet of said passage is fluidly connected to the gas extraction line.

In a further aspect of the device according to the invention, the second outlet of the longitudinal hollow element is fluidly connected to a container for accumulation of the solids.

In yet a further aspect of the invention the device comprises a housing having at least a first outlet, within which housing at least parts of the longitudinal hollow element is arranged, forming a space between an inner surface of the housing and an outer surface of the hollow element, said space in fluid contact with the first outlet of the hollow element and the first outlet of the housing. The space may be delimited by sealed connections between the hollow element and the housing, wherein the connections are arranged on opposite sides of the first outlet of the hollow element in the longitudinal direction of said element. The space may advantageously be annular, or of any other shape or form suitable for fluidly connecting the first outlet of the housing to the first outlet of the longitudinal hollow element.

In one aspect the housing comprises an inlet, and the inlet of the housing is in fluid contact with the inlet of the longitudinal hollow element.

In some aspects of the device according to the invention, the entire longitudinal hollow element is arranged within the housing, and the inlet and the first outlet of said element is in fluid contact with the inlet and the first outlet of the housing, respectively.

In a further aspect the device comprises a container for accumulation of solids, and the interior of the container is fluidly connected to the space, or the first outlet of the housing, by a recycle line having a first and a second end, the first end of the recycle line arranged internal to the container and the second end arranged downstream of the first outlet of the longitudinal hollow element. The first end of the recycle line is advantageously situated at a position which is vertically lower than the position of the second end of the recycle line.

In other aspects of the device according to the invention, the first end of the recycle line comprises a collar, or flange, and a cap arranged in front of said opening, such that solids are prevented from being entrained through the recycle line.

In some aspects, the cap is shaped as a hollow cone arranged with the apex in the upstream direction, the opening of the first end of the recycle line situated within the hollow, and the collar is in the shape of a truncated cone, or right frustum.

In one aspect of the invention, the container comprises a solids outlet.

In a further aspect of the invention, the container is comprised by a section of the housing.

In one aspect of the invention, the longitudinal hollow element is removable from the housing. By comprising a removable, and thus replaceable, hollow element, a device according to the invention will provide a desander having low maintenance costs.

In some aspects of the invention, the housing comprises a pipe element adapted for inline connection, said element preferably I-, T- or Y-shaped.

The present invention further comprises the use of a device as defined above to remove solids from a gas stream.

The present invention also provides a method for removing solids from a gas stream, comprising the steps of:
- introducing the gas stream into a longitudinal hollow element, wherein said gas stream is forced to rotate by use of a rotation-generating element;
- leading a major part of the gas stream through the center of the rotation-generating element in a counter-current direction to the introduced gas stream, and through an outlet in the longitudinal hollow element; and
- leading a minor part of the gas stream, and the solids, in a co-current direction to the introduced gas stream.

The method for removing solids from a gas stream may further comprise the steps of:
- leading the minor part of the gas stream, and the solids, to a container for accumulation of the solids;
- separating the minor part of the gas stream and the solids, recycling the minor part of the gas stream by a recycle line to combine it with the major part of the gas stream.

SHORT DESCRIPTION OF THE DRAWINGS

The invention is described in more detail by use of the appended drawings. The drawings comprise two separate embodiments of the invention.

DETAILED DESCRIPTION OF TWO EMBODIMENTS OF THE INVENTION

Figure 1:
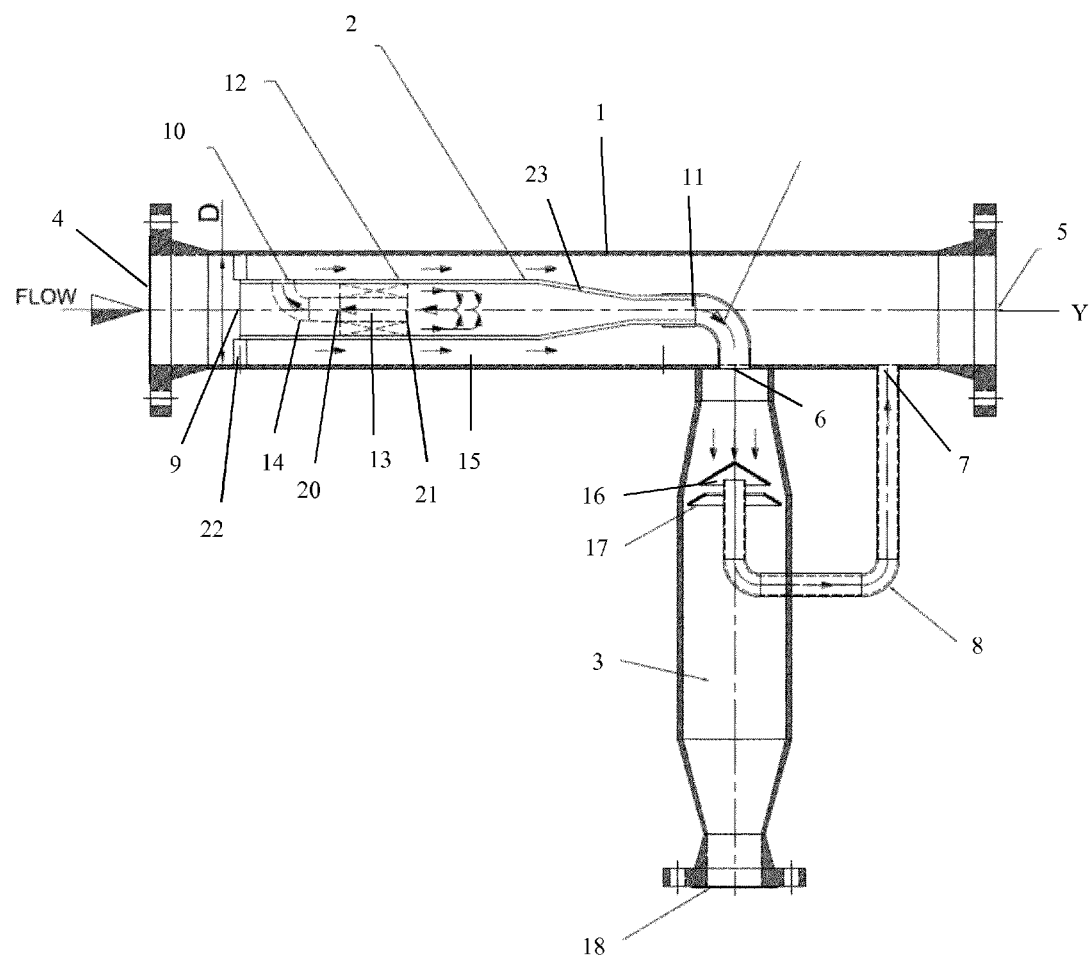
FIG. 1 shows a cross-sectional side view of an embodiment having a horizontal configuration.
Figure 2:
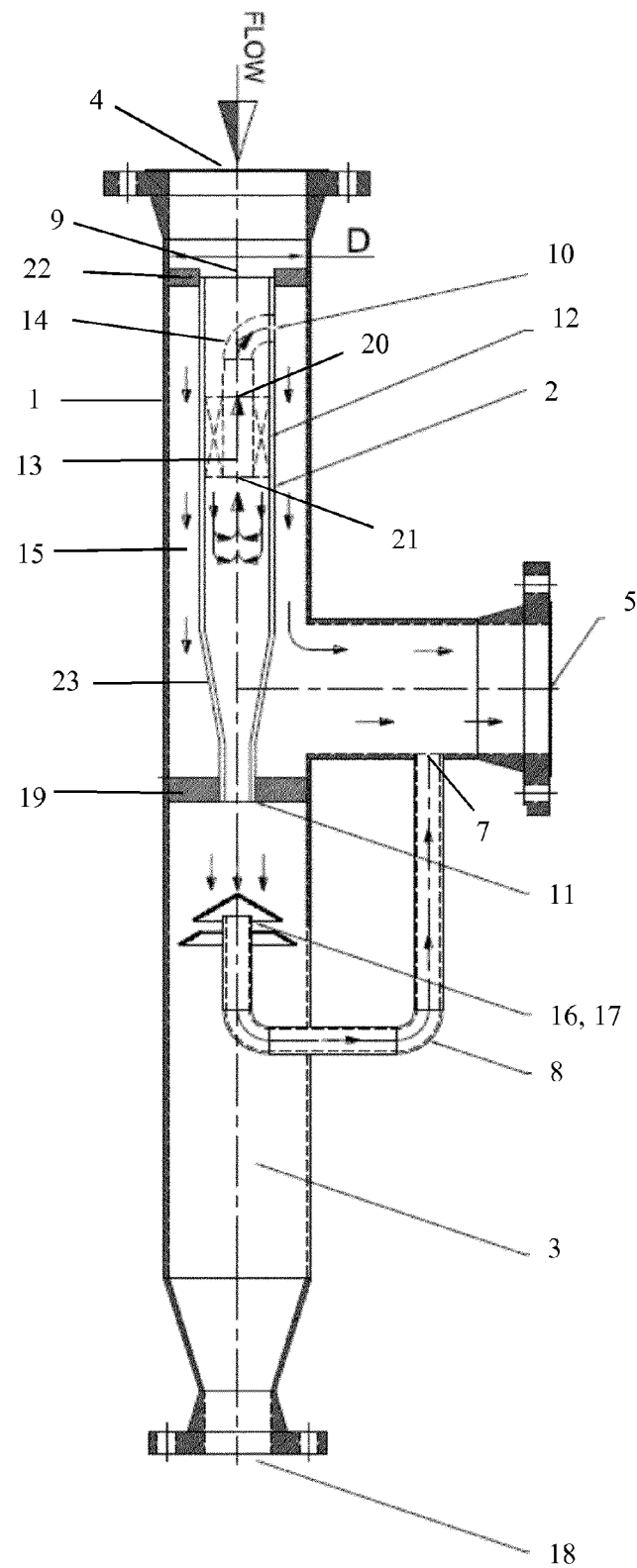
FIG. 2 shows a cross-sectional side view of an embodiment having a vertical configuration.

The present invention is described in more detail by way of two embodiments depicted in FIGS. 1 and 2.

The device for separating solids from a gas stream (in the following termed a "desander"), shown in FIG. 1, is adapted for being positioned in a horizontal inline arrangement. The desander is made up of three main parts, a housing 1, a longitudinal and hollow element 2 (in the following termed the internal separator) being internal to the housing 1, and a container 3 for accumulation of the solids separated from the gas stream. The housing 1 is made up of a straight pipe having a first inlet 4 for the gas stream in one end, and an outlet 5 for the gas stream in the opposite end. In addition, the housing has an outlet 6 for the solids separated from the gas stream, and a second inlet 7 being connected to the solids accumulation container 3 via a gas recycle line or conduit 8. The internal separator 2 has an inlet 9 for the gas stream in fluid contact with the first inlet 4 of the housing, a first 10 and a second outlet 11, and a static swirl- or rotation-generating element 12 arranged annularly within the separator 2. The internal separator 2 is sealingly connected to the housing 1 at its outer circumference, such that a space 15, or annular flow area, is defined between said separator and the housing. A sealed connection 22 between an outer circumference of the internal separator, near its inlet 9, and the housing 1 guides the incoming gas stream into the internal separator. A major part of the internal separator, at least comprising a longitudinal section downstream of the rotation-generating element 12, has a circular inner circumference so that the rotational movement of the gas is maintained. The rotation-generating element 12 comprises rotation-generating means, for instance blades, angled such that a gas stream passing through the internal separator 2 is caused to rotate around a centerline Y of said separator, and has an open passage 13 through its middle along said centerline Y. The passage 13, in the middle of the rotation-generating element 12, has an outlet 20 and an inlet 21. The inlet 21 of the passage is arranged downstream of the rotation-generating means, and the outlet 20 of the passage is fluidly connected to the first outlet 10 of the separator by a gas extraction line 14. The second outlet 11 of the internal separator 2 is arranged following a section 23 of said separator having a restriction of the inner circumference. The section having a decreasing inner circumference is in the present aspect arranged centric to the centerline of the separator, but may optionally be arranged off-center to said centerline. The gas extraction line 14, which is connected to, or is a part of, the outlet 20 of the passage 13 through the rotation-generating element 12, is connected to the gas outlet 5 of the housing via the space 15, or annular flow area, between the internal separator 2 and the housing 1. The interior of the container 3 is fluidly connected to the space 15 by the gas recycle line 8. The upstream section of the gas recycle line, situated in the interior of the container 3, is arranged with a "double Chinese hat" structure. Said structure comprises a hollow cone 16 arranged with the apex in the upstream direction, related to the flow of solids into the container, and the opening of the gas recycle line is situated within the hollow. A collar 17 in the shape of a truncated cone, or right frustum, is situated below the hollow cone 16. The collar is arranged annular to the gas recycle line 8, and below the opening. The "double Chinese hat" limits the re-entrainment of solids to the clean gas outlet 5 of the housing. The solids accumulation container 3 further comprises a solids outlet 18 in the bottom part of the container.

Another embodiment of the desander according to the invention is depicted in FIG. 2. This embodiment is adapted to be positioned in a vertical inline arrangement. In this embodiment, the desander comprises two main parts; a housing 1 and a longitudinal and hollow element 2 (termed an internal separator) being internal to the housing. The desander also comprises a container 3 for accumulation of the solids separated from the gas stream. In this embodiment, the container 3 is designed as an integral section of the housing 1. The housing is made up of a T-shaped pipe having a first inlet 4 for the vertical gas stream in one end, and an outlet for the gas stream arranged in a direction perpendicular to the direction of the incoming gas stream. In addition, the housing 1 has an outlet 18 in the bottom of the section which constitutes the solids accumulator container 3. The internal separator 2 has an inlet 9 for the gas stream in fluid contact with the first inlet 4 of the housing, a first 10 and a second outlet 11, and a static swirl- or rotation-generating element 12 arranged annularly within said separator. The internal separator 2 is sealingly connected to the housing 1 at its outer circumference, such that a space 15, or annular flow area, is defined between said separator and the housing. A sealed connection 22 between an outer circumference of the internal separator, near its inlet 9, and the housing 1 guides the incoming gas stream into the internal separator 2, and a sealed connection 19 between an outer circumference of the internal separator 2, near its second outlet 11, and the housing 1, separates the section of the housing which constitutes the solids container 3 from the flow space 15. A major part of the internal separator 2, at least comprising a longitudinal section downstream of the rotation-generating element 12, has a circular inner circumference so that the rotational movement of the gas is maintained. The rotation-generating element 12 comprises rotation-generating means, for instance blades, angled such that a gas stream passing through said element is caused to rotate around a centerline Y of the internal separator 2, and has an open passage 13 through its middle along said centerline. The passage 13, in the middle of the rotation-generating element 12, has an outlet 20 and an inlet 21. The inlet 21 of the passage is arranged downstream of the rotation-generating means, and the outlet 20 of the passage is fluidly connected to the first outlet 10 of the separator by a gas extraction line 14. The second outlet 11 of the internal separator 2 is arranged following a section 23 of said separator having a restriction of the inner circumference. The section having a decreasing inner circumference is in the present aspect arranged centric to the centerline of the separator, but may optionally be arranged off-center to said centerline. The gas extraction line 14, which is connected to, or a part of, the outlet 20 of the passage 13 through the rotation-generating element 12, is connected to the first gas outlet 5 of the housing via the space 15, or annular flow area, between the internal separator 2 and the housing 1. The interior of the container 3 is fluidly connected to the space 15 by a gas recycle line 8. The upstream section of the gas recycle line 8, situated in the interior of the container 3, is arranged with a "double Chinese hat" structure as described for the embodiment in FIG. 1.

Both embodiments, as depicted in FIGS. 1 and 2, operate by the same mechanism. In use, a gas stream enters the first inlet 4 of the housing 1 and into the inlet 9 of the internal separator. The gas (wet or dry) passes the rotation-generating element 12 and is thereby caused to rotate along the centerline Y of the internal separator 2. Due to the G-forces generated by the rotational movement of the gas, the solids (and liquids if present) are dragged towards the inner wall of the internal separator. Due to the restriction of the inner circumference of said separator in the direction of its second outlet 11 and the rotational movement of the gas, clean gas, i.e. gas depleted of solids, is led towards the center of the internal separator. The major part of the cleaned gas is extracted, in a direction counter to the axial direction of the gas passing the rotation-generating element, via the gas extraction line 14. The solids, and optionally liquids, are transported by help of a minor fraction of the gas into the solids accumulator container 3. To avoid any loss of gas, the minor fraction of gas that enters the container is extracted through the gas recycle line 8 and routed to the gas outlet 5 of the housing. The major fraction of gas, passing through the gas extraction line 14, is commonly about 80% of the total gas volume. The size of the minor gas fraction, and consequently the size of the gas fraction led through the accumulation container and recycled, is regulated in a large part by the dimensions of the gas recycle line. By designing the recycle line 8 to provide a required pressure drop, a desired fraction of extracted and recycled gas is obtained. Optionally, the required pressure drop may be obtained by a choke valve on the recycle line.

In both embodiments of a desander according to the invention two modes of operations concerning the management of the separated solids may be envisioned. The first one is a batch-wise mode, wherein the accumulated solids will be flushed after reaching a specific level. The second mode is an online-mode, wherein the separated solids will be flushed out of the accumulator container in a continuous manner.

In both embodiments, the rotation-generating element 12, including the blades and the open passage 13, is made in one piece by CNC-milling. However, the rotation-generating element may also be constructed by, for instance, blades welded to the inner circumference of the internal separator, and the passage constituted by the gas extraction line 14.

When the desander according to the invention comprises an outer housing, the longitudinal element, or internal separator, is preferably replaceable. By measuring the pressure drop over the desander, the state of the internal separator may be monitored. When the internal separator is ruined by erosion, caused by the solids in the high speed gas stream, the pressure drop over the desander will fall, indicating the need for replacing the internal separator.

All embodiments of the invention use a counter current geometry resulting in very high removal efficiencies of solids from both dry and wet gas. Testing has showed that solids with sizes down to 5 microns can be removed with an efficiency higher than 80%, and up to 99% for particles larger than 10-15 microns. In addition, the desander of the present invention has a very compact design according to piping code, is erosion proof due to the use of hard coating or ceramics internals, and has no rotating internals.

The invention claimed is:
1. A device for removing solids from a gas stream, comprising:
   a longitudinal hollow element comprising an inlet, a first outlet and second outlet;
   a rotation-generating element which is positioned in the longitudinal hollow element and which causes the gas stream to rotate around a centerline of the hollow element, said rotation-generating element being arranged between the first outlet and the second outlet in the longitudinal direction of the hollow element and comprising a central axial passage which is fluidly connected to the first outlet by an extraction line, said first outlet being arranged between the inlet and the rotation-generating element in the longitudinal direction of the hollow element;
   wherein a section of the hollow element between the second outlet and the rotation-generating element has a decreasing inner circumference in the longitudinal direction of the hollow element towards said second outlet, and wherein the second outlet of the longitudinal hollow element is fluidly connected to a container for accumulation of the solids, such that the solids are transported by help of a minor fraction of the gas stream into the container during use; and
   a housing within which the longitudinal hollow element is positioned, the housing having at least a first outlet and forming a space between an inner surface of the housing and an outer surface of the hollow element, said space being in fluid contact with the first outlet of the hollow element and the first outlet of the housing;
   wherein the interior of the container is fluidly connected to at least one of the space or the first outlet of the housing by a recycle conduit having a first end and a second end, the first end being arranged internal to the container and the second end being arranged downstream of the first outlet of the longitudinal hollow element, such that the minor fraction of the gas stream is extracted through the recycle conduit and routed to the first outlet of the housing during use.

2. A device according to claim 1, wherein the housing comprises an inlet which is in fluid contact with the inlet of the longitudinal hollow element.

3. A device according to claim 1, wherein the first end of the recycle conduit comprises an opening and the device further comprises a collar and a cap arranged in front of said opening such that solids are prevented from being entrained through the recycle conduit.

4. A device according to claim 3, wherein the cap is shaped as a hollow cone arranged with its apex in the upstream direction, and wherein the opening of the first end of the recycle conduit situated within the hollow and the collar is in the shape of a truncated cone.

5. A device according to claim 1, wherein the entire longitudinal hollow element is arranged within the housing, and the inlet and the first outlet of said hollow element are in fluid contact with the inlet and the first outlet of the housing, respectively.

6. A device according to claim 1, wherein the container comprises a solids outlet.

7. A device according to claim 1, wherein the container is defined by a section of the housing.

8. A device according to claim 1, wherein the longitudinal hollow element is removable from the housing.

9. A device according to claim 1, wherein the housing comprises a pipe element adapted for inline connection.

10. A device according to claim 9, wherein the pipe element is configured as one from the group consisting of I-shaped, T-shaped and Y-shaped.

* * * * *